J. H. Andrus.
Shirt.

No. 113,128.　　　　Patented Mar. 28, 1871.

Witnesses:
C. Raettig
Alex F. Roberts

Inventor:
J. H. Andrus
per Munn & Co.
Attorneys.

UNITED STATES PATENT OFFICE.

JOHN H. ANDRUS, OF NEW YORK, N. Y.

IMPROVEMENT IN SKIN UNDER-GARMENTS.

Specification forming part of Letters Patent No. 113,128, dated March 28, 1871.

*To all whom it may concern:*

Be it known that I, JOHN H. ANDRUS, of the city, county, and State of New York, have invented a new and useful Improvement in Skin Under-Garments; and I do hereby declare that the following is a full, clear, and exact description thereof, which will enable others skilled in the art to make and use the same, reference being had to the accompanying drawers, forming part of this specification.

This invention relates to improvements in shirts and drawers made of skins, such as buck, kid, or chamois skins; and it consists in the application of cloth, either woven or knit, in place of some of the skin removed, in the parts under the arms of the shirts and between the thighs of the drawers, which are more subject than other parts to damage by the action of the moisture given off by the body and retained in the said places, which has the quality to rot the skins in these parts in a very short time.

Figure 1:
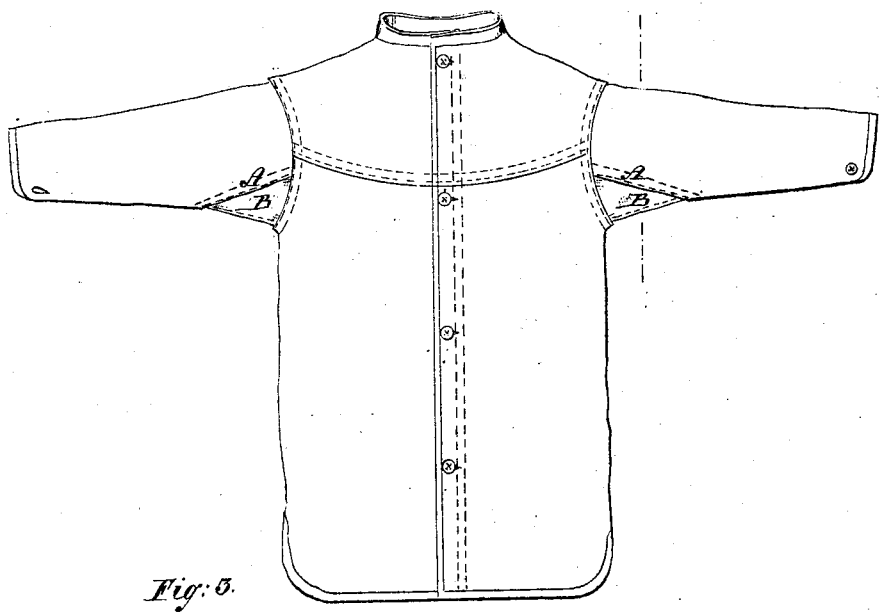
Figure 5:
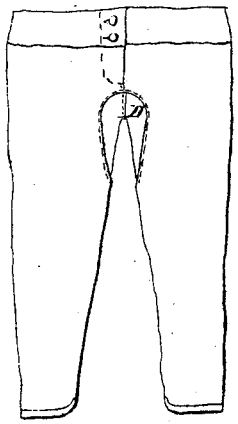
Figure 2:

Figure 1 is a front elevation of a skin shirt having my improvement applied. Fig. 2 is a section across the arm on the line *y y* of Fig. 1. Fig. 3 is a plan view of a pair of drawers having my improvement.

Similar letters of reference indicate corresponding parts.

These skin shirts and drawers have been found practically to be very useful for wear; but it is found that in consequence of the slower escape of the matter discharged from the body under the arms and between the thighs, or it may be the greater amount discharged thereat, the parts of the sleeves covering the armpits, and the parts of the drawers between the thighs, are kept damp and are very soon destroyed. I therefore propose to remove small portions of the sleeve thereat, as indicated at A, and of the drawers, as at D, and substitute small pieces, B, of flannel or other woven or knit stuff which will not be so affected by the said matter, and I thereby completely remove the present objections to these garments, which in all other respects are much more desirable than any made of woven or knit stuff.

Having thus described my invention, I claim as new and desire to secure by Letters Patent—

Garments, worn in contact with the person, formed of animal skin in all parts except under the arms and between the legs, combined with woven or knit fabrics at said last-mentioned places, as and for the purpose specified.

The above specification of my invention signed by me this 2d day of December, 1870.

JOHN H. ANDRUS.

Witnesses:
GEO. W. MABEE,
C. L. TOPLIFF.